Patented Aug. 12, 1952

2,606,906

UNITED STATES PATENT OFFICE 2,606,906

1-(2-PYRIDYL) PIPERAZINE AND PROCESS OF PREPARING SAME

Martin Everett Hultquist, Bound Brook, and Kenneth Leon Howard, Westfield, N. J., assignors to American Cyanamid Company, New York, N. Y., a corporation of Maine No Drawing. Application October 14, 1948, Serial No. 54,574

2 Claims. (Cl. 260—268)

This invention relates to the preparation of 1-heterocyclic piperazines and to the products so obtained. More particularly, it is concerned with the preparation of N-substituted piperazines of the type formula

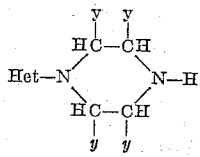

wherein $y$ is hydrogen, a methyl radical, or an ethyl radical, and Het is a mononuclear, five- or six-membered, nitrogen-containing heterocyclic ring, the bond from the piperazine ring to the 1-heterocyclic substituent being to a

group. In particular, the invention is concerned with the cases wherein Het represents a 2-pyridyl, 2-pyrazinyl, 2-thiazolyl, and 2- or 4-pyrimidyl radical. The Het substituent may also be further substituted with simple substituents such as an alkyl, halogen, alkoxy and the like radical. The $y$ substituents may be hydrogen and methyl or hydrogen and ethyl in the same compound. Where one or more substituents are alkyl, different alkyl radicals will not be found in the same compound.

Piperazines having a mononuclear, nitrogen-containing heterocyclic substituent in the 1-position have not been known or generally available. Principally this results from the fact that the more successful methods of preparing 1-substituted piperazines in which the substituent is an alkyl or aryl group are not generally applicable to the introduction of mononuclear heterocyclic substituents. Having been prepared in accordance with the present invention, such 1-heterocyclic substituted piperazines have been found to be variously useful. Several of these compounds exhibit valuable physiological properties. For example, the 1-(2-pyridyl) piperazine exhibits activity as an analgesic. Still more important, the compounds of the present invention serve as intermediates in the preparation of 1,4-disubstituted piperazines in which the substituents are dissimilar. These compounds and their preparation form the subject matter of our copending application, Serial No. 54,573, filed of even date, now Patent No. 2,562,036.

In general, the preparation of the compounds of the present invention is readily carried out. The common feature of the process, in its several variations, is the heating together of from one to four molar portions of the piperazine with one molar portion of a compound of the type Het-Hal where Het is the desired heterocyclic radical to be introduced into the piperazine ring and Hal is chlorine, bromine or iodine.

The temperature conditions will vary with the reactivity of the individual halogenated heterocyclic compound being investigated. The 2- or 4-chloropyrimidine compounds, for instance, react almost spontaneously with piperazine at room temperature; 2-bromopyridine reacts with piperazine at about 130°–140° C.; 2-chlorothiazole reacts with piperazine at about 130°–150° C.; but chloropyrazine requires a temperature above the boiling point of piperazine. The latter reaction, therefore, should be run in a pressure vessel. If it should be necessary to prepare 1-(2-pyrazinyl) piperazine at atmospheric pressure, this may be done by selecting 2-bromo- rather than the chloro derivative.

It is frequently desirable to use an acid binding material. Selection of the proper material will be largely based upon the conditions of the experiment. Alkali metal hydroxides, their carbonates, and the like or organic bases such as piperazine, quinoline, pyridine and the like may be used.

As a medium, the solvent selected usually will depend upon the conditions of the reaction. Aqueous and alcoholic media are convenient solvents. Organic bases such as pyridine, quinoline and the like may also be utilized. The latter have the advantage of also serving as acid-accepting materials.

The products of the reaction may be isolated by either fractional crystallization or fractional distillation. The latter method is preferred as a general procedure because it permits the recovery of piperazine and effectively separates the heterocyclic piperazine from its disubstituted derivative.

When inorganic binding agents are used the reaction product may be isolated from the filtrate, obtained by removal of the inorganic salts, by precipitation as an addition salt of such acids as hydrogen chloride, sulfuric, citric, lactic and the like. The isolated addition salts may be reconverted to the free heterocyclic piperazine by treatment in the usual manner with alkaline agents. Further, purification may be accomplished by fractional crystallization of the addition salts or by distillation of the free bases.

Example 1

A suspension of 87 parts of sodium carbonate in 129 parts of 2-bromopyridine, 140 parts anhydrous piperazine, and 240 parts of Pentasol is stirred and heated at reflux temperature while removing water for 6½ hours. During this heating, the pot temperature rises from 125 to 133–135° C. The cooled suspension is filtered and the filtrate is distilled to remove Pentasol and piperazine. The distilland is then allowed to cool prior to vacuum distillation. The fraction which distills at 141–170° C. (5 mm.) is collected. The yield of crude 1-(2-pyridyl) piperazine is 99.2 parts and the residue weighs 30.0 parts.

Example 2

The suspension of 116 parts of sodium carbonate in 158 parts 2-bromopyridine, 172 parts anhydrous piperazine and 270 parts of 2-B alcohol is shaken for 6 hours at 180° C. in an autoclave. The maximum pressure developed during this heating is 180 p. s. i. After cooling the autoclave, a brown solid cake is removed, and the autoclave is washed with 100 parts 2-B alcohol. This lot is acidified with concentrated hydrochloric acid after the addition of 400 parts of water. The solution is heated to expel carbon dioxide and the remaining alcohol. The solution is cooled, neutralized with 50% sodium hydroxide, meanwhile keeping the temperature below 60° C. The oil which separates solidifies on cooling. It is dissolved in 700 parts of ether, and dried over solid potassium carbonate. Removal of the ether gives 160 parts of a dark-colored crystalline mass which is distilled at water pump pressure to remove any water, alcohol or piperazine. 70 parts of 1-(2-pyridyl) piperazine distills at 130°–150° C. (3–4 mm.). 1,4-di-(2-pyridyl) piperazine may be recovered from the distilland.

Example 3

To 200 parts of 85% alcohol is added 17.2 parts of 2-chloropyrimidine and 34.4 parts of anhydrous piperazine. The reaction mixture is permitted to stand at room temperature for one-half hour. During this interval the temperature rises to 44° C. When the exothermic portion of the reaction has subsided to 40° C., the reaction mixture is heated at reflux temperature for one-half hour. The solution is cooled, acidified with concentrated hydrochloric acid and allowed to stand for three hours. The piperazine dihydrochloride is removed by filtration, washed on the filter with 85% alcohol and dried. Evaporation of the combined filtrate and washings yielded a tan colored material. This product is dissolved in 75 parts of water and made strongly alkaline with 75 parts of 50% sodium hydroxide. The filtrate was extracted with three portions of ethyl acetate and the combined ethyl acetate extractions were dried over anhydrous sodium sulfate. Removal of the ethyl acetate at water pump pressure yields 19 parts of residue. This is treated with excess alcoholic hydrogen chloride and sufficient ether to cause precipitation of the product is added. The yellow product is separated, washed with ether and dried at 90° C. The 23 parts of product thus isolated contains 21.4% chlorine. Five parts of this material is extracted with 100 parts of 2-B alcohol, filtered, and allowed to crystallize. This solid darkens at 286° C. and decomposes at 289°–289.5° C.

Example 4

A suspension of 116 parts anhydrous sodium carbonate in 172 parts anhydrous piperazine, 114.5 parts 2-chloropyrazine, and 270 parts of 2-B alcohol is heated at 200° for 6½ hours. The maximum pressure which develops during this heating is 495 p. s. i. The contents of the autoclave are removed with alcohol and the suspension is filtered. The alcohol is removed by distillation and the piperazine is distilled at water pump pressure. The fraction which distills at 136–169° C. (5–7 mm.) is collected. Redistillation of the oil gives 68.0 parts of an oil which distilled at 141–146° C. (2.0 mm.) A solution of 49.26 parts (0.30 mole) of redistilled 1-(2-pyrazinyl) piperazine in 100 parts of 2-B alcohol is acidified by the addition of 37.8 parts of 7.15 N (0.270 mole) hydrogen chloride in 2-B alcohol. The white product is removed from the yellow filtrate, washed on the funnel with alcohol and dried at 100° C. in the oven.

Example 5

A suspension of 106 parts of sodium carbonate in 172 parts anhydrous piperazine, 119 parts 2-chlorothiazole and 270 parts 2-B alcohol is heated in an autclave at 150° C. for 6½ hours. The maximum pressure which develops during this heating is 230 p. s. i. The semi-liquid mass is transferred from the autoclave with 70 parts of 2-B alcohol and the suspension is filtered. 90 parts of alcohol is used to rinse the salt cake. The salt cake after drying at 50° C. weighs 118 g. After removal of the alcohol and piperazine under water pump pressure the residue is distilled, and the fraction boiling at 120° C. (2.0 mm.) to 140° C. (4.0 mm.) is collected. Redistillation of this fraction yields an oil boiling at 116–117° C. (2.0 mm.) and a second fraction which distills at 118–141° C. (2.0 mm.). The total yield of product is 67.6 parts. The second fraction, 24.1 parts is dissolved in 25 parts of acetone and 40 g. of citric acid and 200 parts of acetone is added. The material which precipitates is removed by filtration, washed on the filter, with acetone, and dissolved in 95 parts of 90% alcohol. The product thus isolated melts at 187–188.5° C.

Example 6

To 200 parts of absolute ethyl alcohol is added 78 parts of piperazine hexahydrate and 29.8 parts of 2,5-dichloropyrimidine. The reaction mixture was warmed slightly to start the reaction; the temperature rose rapidly to the boiling point of the reaction mixture. When the exothermic portion of the reaction had subsided, the reactants were heated for one hour at reflux temperature, cooled and acidified with alcoholic hydrogen chloride. The piperazine dihydrochloride which separates is removed and the reaction mixture worked up as described in Example 3. 26 parts of a white crystalline solid is obtained.

Example 7

A suspension of 50 parts of sodium carbonate in 79 parts of 2-bromopyridine, 114 parts of 2,5-dimethylpiperazine and 200 parts of absolute alcohol is heated in an autoclave for 6 hours at 160° C. The maximum pressure which develops during the heating is 180 p. s. i. The product is worked up as described in Example 2. The fraction boiling at 123–133° C. (2.5 mm.) has a weight of 42 parts.

We claim:

1. A 1-heterocyclic piperazine of the formula

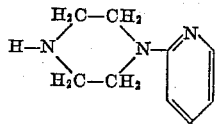

2. A method of preparing 1-(2-pyridyl)piperazine which comprises reacting piperazine with 2-bromopyridine in a solvent.

MARTIN EVERETT HULTQUIST.
KENNETH LEON HOWARD.

REFERENCES CITED

The following references are of record in the file of this patent:

UNITED STATES PATENTS

| Number | Name | Date |
|---|---|---|
| 2,459,367 | Denton et al. | Jan. 18, 1949 |